(12) United States Patent
Sato

(10) Patent No.: US 8,156,761 B2
(45) Date of Patent: Apr. 17, 2012

(54) METHOD FOR PRODUCING QUARTZ GLASS USING A MIXED POWDER

(75) Inventor: Tatsuhiro Sato, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 0 days.

(21) Appl. No.: 13/023,262

(22) Filed: Feb. 8, 2011

(65) Prior Publication Data

US 2011/0120190 A1 May 26, 2011

Related U.S. Application Data

(62) Division of application No. 11/897,406, filed on Aug. 30, 2007, now Pat. No. 7,905,932.

(30) Foreign Application Priority Data

Aug. 31, 2006 (JP) ................................. 2006-236178

(51) Int. Cl.
*C03B 19/00* (2006.01)
*C03B 19/01* (2006.01)
*C03B 19/09* (2006.01)
*C03B 19/06* (2006.01)
*C03C 3/06* (2006.01)
*C03C 3/11* (2006.01)
*C03C 3/112* (2006.01)

(52) U.S. Cl. ............. 65/17.6; 65/17.3; 65/17.4; 65/144; 501/54; 501/56; 501/57

(58) Field of Classification Search ................ 501/14, 501/16, 17, 18, 19, 21, 53, 54, 56, 57, 68, 501/69, 70; 65/17.3, 17.4, 17.6, 144
See application file for complete search history.

(56) References Cited

U.S. PATENT DOCUMENTS

| 4,097,295 | A  | * | 6/1978  | Chyung et al. ............... 501/56 |
| 4,186,021 | A  |   | 1/1980  | Chyung et al. |
| 5,576,253 | A  |   | 11/1996 | Osafune et al. |
| 6,129,899 | A  | * | 10/2000 | Katsuro et al. ............. 423/338 |
| 6,329,309 | B1 |   | 12/2001 | Kanamaru et al. |
| 6,732,546 | B1 | * | 5/2004  | Yajima et al. ............... 65/17.4 |
| 2005/0272588 | A1 | * | 12/2005 | Sato et al. .................. 501/54 |

FOREIGN PATENT DOCUMENTS

| JP | 9-95771   | 6/1976 |
| JP | 9-95772   | 7/1976 |
| JP | 10-139480 | 5/1998 |
| JP | 11-228172 | 8/1999 |

OTHER PUBLICATIONS espacenet English language abstract for JP 11-228172 published on Aug. 24, 1999.
espacenet English language abstract for JP 10-139480 published on May 26, 1998.

* cited by examiner

*Primary Examiner* — Jerry Lorengo
*Assistant Examiner* — Noah Wiese
(74) *Attorney, Agent, or Firm* — Tiajoloff & Kelly LLP

(57) ABSTRACT

A mixed quartz powder contains quartz powder and two or more types of doping element in an amount of from 0.1 to 20 mass %. The aforementioned doped elements include a first dope element selected from the group consisting of N, C and F, and a second dope element selected from the group consisting of Mg, Ca, Sr, Ba, Sc, Y, Ti, Zr, Hf, the lanthanides and the actinides. The "quartz powder" is a powder of crystalline quartz or it is a powder of glassy $SiO_2$ particles. It is made form natural occurring quartz or it is fabricated synthetically. The "quartz powder" may be doped. The compounding ratio of the total amount (M1) of the aforementioned first elements and the total amount (M2) of the aforementioned second elements as the ratio of the number of atoms (M1)/(M2) is preferably from 0.1 to 20. Al as well as the aforementioned doped elements is preferably included in a mixed quartz powder of this invention.

15 Claims, No Drawings

METHOD FOR PRODUCING QUARTZ GLASS USING A MIXED POWDER

RELATED APPLICATIONS

This application is a divisional application of U.S. patent application Ser. No. 11/897,406 filed Aug. 30, 2007 by applicant Tatsuhiro Sato, published as U.S. published application US 2008-0053151-A1 which is herein incorporated by reference.

TECHNOLOGICAL BACKGROUND

The present invention relates to a method for the production of quartz glass which has excellent plasma erosion resistance and can be used for semiconductor production. Furthermore, the invention relates to a mixed powder which can be used in the production of the said quartz glass.

In the production of semiconductors, for example in the production of semiconductor wafers, treatment efficiency has been improved in recent years by increasing the diameter and using plasma reaction apparatus for etching processes and the like. For example, in the semiconductor wafer etching process the etching treatment has been carried out using a plasma gas, such as fluorine-(F) based plasma gas for example.

However, when conventional quartz glass is located in an F-based plasma gas atmosphere, for example, the F-based plasma gas reacts with the $SiO_2$ at the quartz glass surface and $SiF_4$ is produced and this has a boiling point of $-86°$ C. and so volatilizes readily and the quartz glass is eroded in large amounts and becomes thin and the surface becomes rough, and this material is unsuitable for use as jigs in F-based plasma gas atmospheres.

In this way conventional quartz glass gives rise to serious problems with erosion resistance, which is to say plasma erosion resistance, with plasma reactions, and specially in etching treatments in which F-based plasma gas is used, in semiconductor production. Hence improvement of the plasma erosion resistance by coating aluminium or an aluminium compound on the surface of the quartz glass parts has been proposed (Patent Citations 1 to 3), and plasma erosion resistant glass where the plasma erosion resistance has been improved by including aluminium in quartz glass has also been proposed (Patent Citation 4).

Adopting this procedure, a mixture of 5 wt % alumina powder in quartz powder was heated and fused under vacuum, quartz glass was formed and the plasma erosion resistance was investigated. When this was done the etching rate was from 40 to 50% lower than that of completely undoped quartz glass parts.

With this material, the boiling point of the $AlF_3$ which is produced on reacting with an F-based plasma gas is 1290° C., a much higher temperature than that of $SiF_4$ and so, while on the one hand the $SiF_4$ part is greatly eroded, the $AlF_3$ part does not volatilize to any great extent at the surface and it is thought that this is why the difference in the etching rates is so great.

The following documents represent the prior art: Japanese Unexamined Patent application Laid Open H9-95771, Japanese Unexamined Patent application Laid Open H9-95772, Japanese Unexamined Patent application Laid Open H10-139480, Japanese Unexamined Patent application Laid Open H11-228172.

Problems to be Resolved by the Invention

However, the etching rates of these parts are still high when compared with those of ceramic jigs and further reduction of the etching rate is very desirable.

The present invention is intended to provide a method for the production of quartz glass having excellent plasma erosion resistance which can be used for semiconductor production, and to provide a powder which can be used in the production of the said quartz glass.

Means of Resolving these Problems

In order to resolve the abovementioned problems, the powder of this invention is a mixed quartz powder which contains quartz powder and two or more types of doping element in an amount of from 0.1 to 20 mass %, and it is characterized in that the aforementioned doped elements include a first dope element selected from the group consisting of N, C and F, and a second dope element selected from the group consisting of Mg, Ca, Sr, Ba, Sc, Y, Ti, Zr, Hf, the lanthanides and the actinides.

The "quartz powder" is a powder of crystalline quartz or it is a powder of glassy $SiO_2$ particles. It is made form natural occurring quartz or it is fabricated synthetically. The "quartz powder" may be doped.

The compounding ratio of the total amount (M1) of the aforementioned first elements and the total amount (M2) of the aforementioned second elements as the ratio of the number of atoms (M1)/(M2) is preferably from 0.1 to 20.

Moreover Al as well as the aforementioned doped elements is preferably included in a mixed quartz powder of this invention.

The compounding ratio of the total amount (M1+Al) of the aforementioned first elements and Al and the total amount (M2) of the aforementioned second elements as the ratio of the number of atoms (M1+Al)/(M2) is preferably from 0.1 to 20.

A preferred embodiment of the mixed powder is characterized in that it comprises a first powder containing the first dope element, and the second powder containing the second dope element.

The mixed powder may consist of first quartz powder containing the first dope element and a second quartz powder containing the second element. In a preferred embodiment the mixed quartz powder is characterized in that it comprises quartz powder which not doped and additionally it comprises the first powder which is a powder of the first dope element, and the second powder which is a powder of the second dope element.

An alternative mixed powder is characterized in that it comprises a quartz powder containing the first dope element and the second powder containing the second dope element.

Preferably, said quartz powder comprises a hydroxyl group content in the range from 50 to 200 wtppm.

The method for the production of quartz glass of this invention is a method in which quartz glass which has excellent plasma erosion resistance is produced from powder with the Verneuil method which is characterized in that the aforementioned powder is a mixed powder of this invention as described earlier and, when the said mixed quartz powder is being heated, fused and dropped and a quartz glass ingot is being produced, the surface temperature of the said quartz glass ingot is heated to at least 1800° C. Quartz glass of this invention can be produced ideally by means of the said method.

Reducing gas is preferably supplied to the heating atmosphere area and the ratio of hydrogen/oxygen which is supplied is preferably at least 2.5. Furthermore, the supply of a gas which contains N or C to the heating atmosphere area is ideal.

In the embodiments of the method for the production of quartz glass of this invention the pressure at the time of the aforementioned heating and fusion is 2 kg/cm² or above.

Quartz glass ingots which have been produced in the method for the production of quartz glass of this invention are preferably re-heated and moulded at a temperature of 1500° C. or above in an inert gas atmosphere at a pressure of 2 kg/cm² or above. The bubbles and cracks in the glass ingots can be eliminated by means of the said heating and moulding treatment.

Effects of the Invention

The quartz glass of this invention are effective as jig materials for the plasma reactions which are used in semiconductor production in that they have excellent plasma erosion resistance, and especially erosion resistance in respect of F-based plasma gas. The method of the invention has an advantage in that quartz glass which has excellent plasma erosion resistance can be produced with good efficiency. The mixed powder of this invention is especially desirable as the material for a quartz glass of this invention.

PREFERRED EMBODIMENTS OF THE INVENTION

Practical embodiments of the invention are described below, but these are illustrative embodiments and of course they could be modified in various ways without deviation from the technical concept of the present invention.

The method for producing quartz glass according to the invention is a method using a mixed quartz powder which contains from 0.1 to 20 mass %, and preferably from 1.0 to 17 mass %, of two or more types of doping element and which contains the aforementioned first element and second element as the aforementioned doping elements is ideal.

The mixed quartz powder preferably also contains Al as a doping element in addition to the aforementioned first and second elements.

The aforementioned first element inhibits the chemical etching reaction with F-based plasma gas and enables the overall etching rate to be reduced.

Moreover, the aforementioned second element forms a fluoride with a higher boiling point than Al fluoride and enables the overall etching rate to be reduced. For example, the boiling point of $NdF_3$ is 2327° C. and, so on investigating the plasma erosion rate it is possible to reduce the etching rate when compared with a quartz glass part which has not been doped at all. As a result the etching rate is reduced by from 70% to 95%.

Furthermore, the aforementioned first element, when present along with the aforementioned second element, improves the electrical stability and the dispersion in the atomic state and there is no condensation and white foreign body formation and particle generation from crack formation is suppressed, there is more stabilization within the quartz glass and the etching rate can be reduced even more. Moreover, the aforementioned first element is an element which has the least effect in the semiconductor production process and so this is ideal.

In those cases where Al is included in the quartz glass of this invention in addition to the aforementioned first and second element it is effective by increasing the electrical stability in the quartz glass and suppressing the formation of white foreign matter.

If the compounding ratio of the total amount (M1+Al) of the aforementioned first element and Al and the total amount (M2) of the aforementioned second element is such that, as the ratio of the numbers of atoms, (M1+Al)/M2 is from 0.1 to 20, and preferably from 0.2 to 18, the electrical stability is good and the formation of turbidity, bubbles, foreign matter and the like is suppressed to a low level and so this is ideal.

The particle size of the aforementioned mixed powder is preferably from 0.1 to 100 μm, and more desirably from 10 to 50 μm.

No particular limitation is imposed upon compounding proportions of each of the doping elements in the said mixed powder provided that the total doping element content is within the range from 0.1 to 20 mass %, but the proportions are preferably such that the compounding ratio of the total amount (M1+Al) of the aforementioned first element and Al and the amount (M2) of the second element is, as the ratio of the numbers of atoms, (M1+Al)/M2, from 0.1 to 20, and more desirably from 0.2 to 18.

No particular limitation is imposed upon the method for the production of the said mixed powder but, for example, it can be obtained ideally by mixing powders which contain the doping elements and quartz powder. No particular limitation is imposed upon the aforementioned powders which contain the doping elements, and materials comprising the doping elements or compounds which contain the doping elements can be used. In more practical terms examples include SiN (representing here compositions of silicon and nitrogen, e.g. $Si_3N_4$), SiC, $AlF_3$, oxides of Al and oxides of the second elements.

Furthermore, mixed quartz powders can be obtained by diffusing a vapour of one or more volatile compounds which contains the aforementioned doping elements into a quartz powder which has hydroxyl groups and then carrying out a heat treatment in the temperature region from 200 to 1100° C. No particular limitation is imposed upon the aforementioned volatile substance which contains the doping elements provided that it is a volatile substance which contains one or more of the said doping elements, and examples include aluminium chloride, yttrium chloride, hexamethyldisilazane and volatile gases such as $SiF_4$. No particular limitation is imposed upon the hydroxyl group content in the aforementioned quartz powder but it is preferably from 50 to 200 wtppm.

Moreover, a solution which contains the aforementioned doping elements and quartz powder may be dried to form a mixed quartz powder. The said solution is preferably a slurry solution which has been obtained by mixing quartz powder and a solution which has been prepared by mixing and dissolving substances which contain the doping elements in a solvent. No particular limitation is imposed upon the aforementioned solvent and examples include pure water, acidic solutions, basic solutions and organic solvents.

No particular limitation is imposed upon the aforementioned substances which contain the doping elements provided that there are substances which contain one or more doping elements and they are soluble in the solvent which is being used, and units comprising the doping elements and compounds which contain the doping elements can be used, and examples include nitrates which contain a doping element such as ammonium nitrate, aluminium nitrate or yttrium nitrate, silicone compounds, ammonium fluoride, ammonia, $SiF_4$ and oxides of the doping elements.

The method in which a quartz glass ingot is produced with the Verneuil method using quartz powder can be cited as the method for the production of quartz glass of this invention. The aforementioned mixed powder is preferably used for the said quartz powder. When the quartz powder is being heated, fused and dropped and a quartz glass ingot is being formed, heating to set the surface temperature of the said quartz glass ingot to at least 1800° C., and preferably to from 1900 to 2100° C., is ideal for satisfactory fusion.

In those cases where the aforementioned Verneuil method is a Verneuil method in which an oxy-hydrogen flame is used, the ratio of hydrogen/oxygen which is supplied to the heating atmosphere area is preferably at least 2.5, and more desirably from 3.0 to 6.0.

Furthermore, it is possible to admix N or C efficiently by supplying gas which contains N or C to the heating atmosphere area. $N_2$, $NH_3$, volatile organosilicon compounds and propane gas are ideal as the aforementioned gases which contain N or C.

In those cases where bubbles or cracks remain in the quartz glass ingot which has been formed with the method for the production of quartz glass of this invention, the residual bubbles and cracks in the ingot can be reduced by subjecting the ingot to heating and forming at a temperature of at least 1300° C., and preferably of from 1600 to 1900° C., in an inert gas atmosphere under a pressure of at least 2 kg/cm$^2$, and preferably of from 4.0 to 10 kg/cm$^2$. Examples of the aforementioned inert gas include He, $N_2$, Ar and the like.

The quartz glass of this invention comprises at least a layer comprising quartz glass and containing the doping elements of this invention formed with a thickness to a depth of at least 1 mm from the surface. It is possible by forming such a layer comprising quartz glass of this invention to obtain a jig which has plasma erosion resistance improved to the required minimum level for a quartz glass jig. Moreover, the way in which the doping elements are included in a quartz glass jig of this invention may be such that they are doped into the whole of the quartz glass jig, but the formation of a doping element containing layer at the prescribed locations where plasma resistance is required and making the other parts with quartz glass which does not contain the doping elements is effective for reducing costs and is preferred.

No particular limitation is imposed upon the method by which the layer comprising quartz glass of this invention is formed locally but it is preferably carried out, for example, using quartz glass or mixed powder of this invention for 1) a fillet welding process with flame working, 2) a flame coating process, 3) coating (painting) or 4) an attachment process.

ILLUSTRATIVE EXAMPLES

The invention is described in more practical terms below by means of examples, but these examples are simply illustrative and should not of course be interpreted as limiting the invention.

Example 1

Mixed quartz powder obtained by mixing together 933 g of quartz particles, 38 g of $Y_2O_3$ powder, 13 g of SiN powder and 17 g of SiC powder was fused and dropped at a rate of 50 g/minute in an oxy-hydrogen flame onto a target ingot which was being rotated at 1 rpm and a quartz ingot of 100 mm diameter×60 mm was formed. The gas conditions used were $H_2$ 300 l/min and $O_2$ 100 l/min. The temperature of the ingot growth surface was 1950° C.

On inspection using the optical visual method for bubbles and foreign matter inside the aforementioned ingot so obtained the bubble and foreign body content was 5 mm$^2$ as the projected area per 100 cm$^3$. Furthermore, the internal transmittance of visible light was 80%/cm.

The aforementioned ingot so obtained was set in a heat treatment furnace and maintained for 1 hour at 1800° C. under a pressure of 6 kg/cm$^2$ in an $N_2$ atmosphere and formed to 240 mm diameter×10 mm thick.

A sample was cut out of the glass moulding so obtained and, on measuring the element concentrations in the glass body by means of fluorescence X-ray analysis, Y was 3.0 wt %. As a result of measuring the N and C contents from the de-gassing analysis at 1000° C. 500 wtppm of N and 500 wtppm of C were detected.

Furthermore, a ring-shaped jig of external diameter 220 mm×internal diameter 170 mm×5 mm thick was cut out and worked from the glass moulding so obtained. A silicon wafer was set on the internal diameter part of the cut-out jig and the assembly was set in etching apparatus and an etching test was carried out for 100 hours at 30 torr and 1 kw with a 50 sccm flow of $CF_4+O_2$ (20%) plasma gas. The etching rate was calculated from the change in thickness before and after the test and a result of 10 nm/min was obtained.

Example 2

Mixed quartz powder obtained by mixing together 946 g of quartz particles, 38 g of $Al_2O_3$ powder, 13 g of $Y_2O_3$ powder, 1 g of SiN powder, 1 g of SiC powder and 1 g of $AlF_3$ powder was fused and dropped at a rate of 50 g/minute in an oxy-hydrogen flame onto a target ingot which was being rotated at 1 rpm and a quartz ingot of 100 mm diameter×60 mm was formed. The gas conditions used were $H_2$ 300 l/min, $O_2$ 100 l/min, $NH_3$ 10 l/min and propane gas 10 l/min. The temperature of the ingot growth surface was 1950° C.

The ingot which had been produced was treated and evaluated in the same way as in Example 1 and similar results were obtained. However, on investigating the bubbles and foreign matter inside the ingot with the optical visual method the bubble and foreign body content was 4 mm$^2$ as the projected area per 100 cm$^3$. Furthermore, on measuring the element concentrations of Y, Al, N, C and F in the glass after cutting out a sample from the glass moulding so obtained they were found to be 1.0 wt %, 2.0 wt %, 300 wtppm, 300 wtppm and 300 wtppm respectively.

Example 3

Mixed quartz powder obtained by mixing together 721 g of quartz particles, 246 g of $Al_2O_3$ powder, 32 g of $Y_2O_3$ powder, 1 g of SiN powder, 1 g of SiC powder and 1 g of $AlF_3$ powder was fused and dropped at a rate of 50 g/minute in an oxy-hydrogen flame onto a target ingot which was being rotated at 1 rpm and a quartz ingot of 100 mm diameter×60 mm was formed. The gas conditions used were $H_2$ 300 l/min, $O_2$ 100 l/min, $NH_3$ 10 l/min and propane gas 10 l/min. The temperature of the ingot growth surface was 1950° C.

The ingot which had been produced was treated and evaluated in the same way as in Example 1 and similar results were obtained. However, on investigating the bubbles and foreign matter inside the ingot with the optical visual method the bubble and foreign body content was 4 mm$^2$ as the projected area per 100 cm$^3$.

Furthermore, on measuring the element concentrations of Y, Al, N, C and F in the glass after cutting out a sample from the glass moulding so obtained they were found to be 2.5 wt %, 13.0 wt %, 300 wtppm, 300 wtppm and 300 wtppm respectively.

Example 4

Mixed quartz powder obtained by mixing together 960 g of quartz particles, 38 g of $Al_2O_3$ powder, 12 g of $Nd_2O_3$ powder, 1 g of SiN powder, 1 g of SiC powder and 1 g of AlF$_3$ powder was fused and dropped at a rate of 50 g/minute in an oxy-hydrogen flame onto a target ingot which was being rotated at 1 rpm and a quartz ingot of 100 mm diameter×60 mm was formed. The gas conditions used were H$_2$ 300 l/min, O$_2$ 100 l/min, NH$_3$ 10 l/min and propane gas 10 l/min. The temperature of the ingot growth surface was 1950° C.

The ingot which had been produced was treated and evaluated in the same way as in Example 1 and similar results were obtained. However, on investigating the bubbles and foreign matter inside the ingot with the optical visual method the bubble and foreign body content was 4 mm$^2$ as the projected area per 100 cm$^3$. Furthermore, on measuring the element concentrations of Nd, Al, N, C and F in the glass after cutting out a sample from the glass moulding so obtained they were found to be 1.0 wt %, 2.0 wt %, 300 wtppm, 300 wtppm and 300 wtppm respectively.

Example 5

The same mixed quartz powder as in Example 2 was packed into a carbon casting mould and heated and fused at 1800° C. in N$_2$ gas at a pressure of 4 kg/cm$^2$ and an ingot was formed, and then the same treatment as in Example 1 was carried out and a quartz glass moulding was obtained. A sample was prepared in the same way as in Example 2 and this was evaluated and results the same as those in Example 2 were obtained.

Example 6

Mixed quartz powder the same as in Example 2 was packed into a quartz tube and heated and fused at 1800° C. from the outer surface of the tube while reducing the pressure inside the tube and an ingot was formed, and this was subsequently treated in the same way as in Example 1 and a quartz glass moulding was obtained. A sample was prepared in the same way as in Example 2 and this was evaluated and results the same as those in Example 2 were obtained.

Comparative Example 1

Quartz particles (1000 g) were packed into a carbon casting mould and heat-treated for 1 hour at 1800° C. in a vacuum environment and a transparent glass body of diameter 100 mm×60 mm was formed. Furthermore, a sample was produced in the same way as in Example 1 and, on carrying out a plasma etching test, the etching rate was 120 nm/min. The results of other evaluations were the same as in Example 1.

Comparative Example 2

Quartz powder (944 g) and 56 g of Al$_2$O$_3$ powder were mixed and, using the mixed quartz powder so obtained, a sample was produced and evaluated in the same way as in Example 1. The etching rate was 70 nm/min.

Comparative Example 3

Quartz powder (962 g) and 38 g of Y$_2$O$_3$ powder were mixed and, using the mixed powder so obtained, a sample was produced and evaluated in the same way as in Example 1. A large number of white specs (foreign matter) remained in the quartz glass body. The etching rate was 60 nm/min.

Comparative Example 4

An experiment was carried out in the same way as in Example 1 except that mixed quartz powder obtained by mixing 546 g of quartz particles, 416 g of Al$_2$O$_3$ powder and 38 g of Y$_2$O$_3$ powder was used. The metal element concentration in the aforementioned mixed quartz powder was 25 mass % and the Al/Y atomic ratio was 24. A large number of bubbles remained in the quartz glass body obtained. The etching rate was 60 nm/min.

TABLE 1

| | Quartz Glass Doping Elements | | | | (M1 + Al)/M2 | Results | |
|---|---|---|---|---|---|---|---|
| | Type | | | Total Conc. | Atomic Number | Etching Rate | Bubbles, Foreign |
| | M1 | M2 | Other | (wt %) | Ratio | (nm/min) | matter |
| Example 1 | N, C | Y | — | 3.1 | 0.3 | 10 | ◯ |
| Example 2 | N, C, F | Y | Al | 3.1 | 7.2 | 10 | ◯ |
| Example 3 | N, C, F | Y | Al | 15.6 | 17.4 | 10 | ◯ |
| Example 4 | N, C, F | Nd | Al | 3.1 | 11.7 | 10 | ◯ |
| Example 5 | N, C, F | Y | Al | 3.1 | 7.2 | 10 | ◯ |
| Example 6 | N, C, F | Y | Al | 3.1 | 7.2 | 10 | ◯ |
| Comp. Ex. 1 | — | — | — | — | — | 120 | ◯ |
| Comp. Ex. 2 | — | — | Al | 3.0 | — | 70 | ◯ |
| Comp. Ex. 3 | — | Y | — | 3.0 | 0.0 | 60 | Foreign matter |
| Comp. Ex. 3 | — | Y | Al | 25.0 | 24 | 60 | Bubbles |

The invention claimed is:

1. A method for producing quartz glass from powder using a Verneuil method, said method comprising:
   providing a mixed powder comprising quartz powder and two or more types of dope elements in an amount of from 0.1 to 20% by mass in total, wherein the dope elements comprise a first element selected from the group consisting of N, C and F, and a second element selected from the group consisting of Mg, Ca, Sr, Ba, Sc, Y, Ti, Zr, Hf, lanthanides and actinides by mixing said quartz powder with said dope elements so as to form said mixed powder;
   producing a quartz glass ingot by sequentially heating, fusing and dropping the mixed powder; and
   wherein, during said producing of the quartz glass ingot, the mixed powder is heated such that a surface temperature of the quartz glass ingot reaches 1800° C. or more; and
   wherein the quartz powder has a hydroxyl group content in a range from 50 to 200 wtppm.

2. A method for producing quartz glass according to claim 1, wherein a reducing gas is supplied in a heating atmosphere area, said reducing containing hydrogen gas and oxygen gas each supplied at a respective rate of supply determined as volume per time and a ratio of the rate of supply of the hydrogen gas to the rate of supply of the oxygen gas is 2.5 or more.

3. A method for producing quartz glass according to claim 1, wherein a gas comprising N or C is supplied in a heating atmosphere area.

4. A method for producing quartz glass according to claim 1, wherein a total number of atoms (M1) of the first element and a total number of atoms (M2) of the second element, are present in the mixed powder with a blending ratio, defined by (M1)/(M2), that is from 0.1 to 20.

5. A method for producing quartz glass according to claim 1, wherein the dope elements further include aluminum.

6. A method for producing quartz glass according to claim 5, wherein a total number of atoms (M1) of the first element and a total number of atoms (Al) of aluminum and a total number of atoms (M2) of the second element, are present in the mixed powder in a blending ratio, defined by (M1+Al)/(M2), that is from 0.1 to 20.

7. A method for producing quartz glass according to claim 1, wherein said quartz powder is derived by mixing a first powder containing the first dope element, and a second powder containing the second dope element.

8. A method for producing quartz glass according to claim 7, wherein the first powder is a powder of the first dope element, and the second powder is a powder of the second dope element.

9. A method for producing quartz glass according to claim 1, wherein said quartz powder comprises the first dope element and the second dope element.

10. The method according to claim 1, wherein a total number of atoms (M1) of the first element and a total number of atoms (M2) of the second element, are present in the mixed powder in a blending ratio, defined by (M1)/(M2), that is from 0.1 to 20.

11. The method according to claim 1, wherein the dope elements further include aluminum.

12. The method according to claim 11, wherein a total number of atoms (M1) of the first element and a total number of atoms (Al) of aluminum and a total number of atoms (M2) of the second element, are present in the mixed powder in a blending ratio, defined by (M1+Al)/(M2), that is from 0.1 to 20.

13. The method according to claim 1, wherein said mixed powder contains a first powder containing the first dope element, and a second powder containing the second dope element.

14. The method according to claim 13, wherein the first powder is a powder of the first dope element, and the second powder is a powder of the second dope element.

15. The method according to claim 1, wherein said mixed powder comprises a first quartz powder containing the first dope element and a second quartz powder containing the second dope element.

* * * * *